Oct. 13, 1970 N. W. SJOBERG 3,533,116

TAPE LAYING MACHINE

Filed Feb. 14, 1969 2 Sheets-Sheet 1

INVENTOR.
NILS W. SJOBERG

BY

Kenway, Jenney & Hildreth

ATTORNEYS

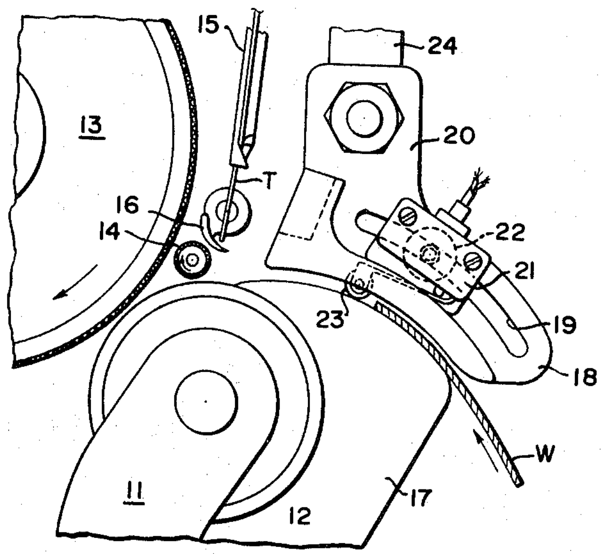
FIG. 2
FIG. 5
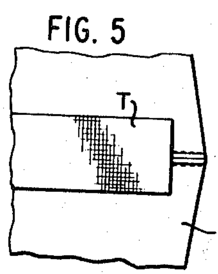
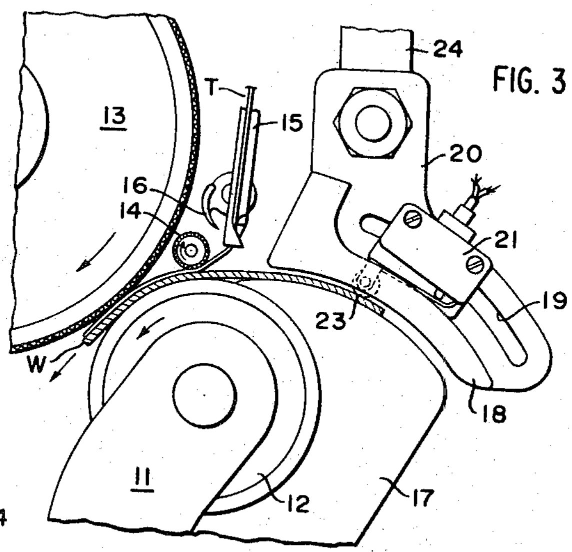
FIG. 3
FIG. 4
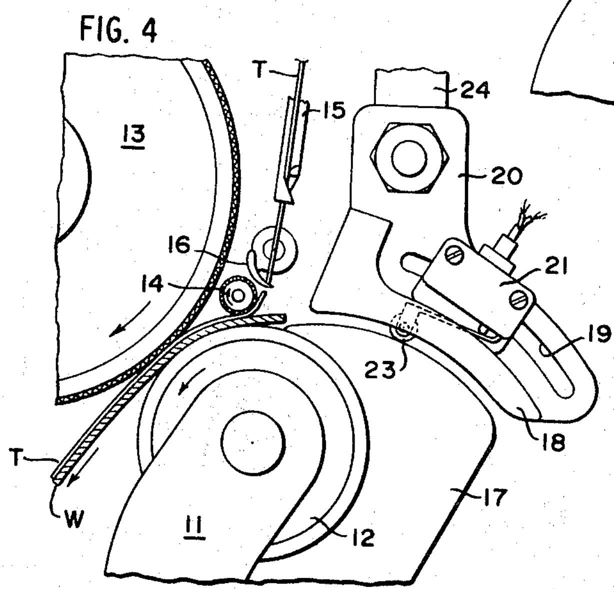
INVENTOR.
NILS W. SJOBERG
BY
Kenway, Jenney & Hildreth
ATTORNEYS United States Patent Office 3,533,116

Patented Oct. 13, 1970

3,533,116
TAPE LAYING MACHINE

Nils W. Sjoberg, Lynn, Mass., assignor to Prime Manufacturing Company, Lynn, Mass., a corporation of Massachusetts

Filed Feb. 14, 1969, Ser. No. 799,442
Int. Cl. A43d *11/00*
U.S. Cl. 12—59.5 7 Claims

ABSTRACT OF THE DISCLOSURE

Tape applying machine having work-feeding rolls and a tape-severing knife controlled by a microswitch adjustably mounted on a work engaging presser foot and operating automatically to sever the tape at a point flush with the trailing end of the work or at a predetermined distance within it.

This invention comprises a new and improved machine for applying tape of measured length to the back seam or other portion of a shoe upper, or for reinforcing or sealing other articles of manufacture for shipment and storage.

While the machine of this invention has many features of general application it is in one aspect an improvement on the machine disclosed in United States Letters Patent 3,102,287, Sjoberg. In the machine of that patent the point of tape cut off is determined by a timer arranged to be set by the operator so that the end of the applied tape may lie flush with the trailing edge of the current piece of work or at any predetermined distance within the edge. A machine of that kind has proved entirely satisfactory when dealing with shoes manufactured in solid sizes since one setting of the timer adapts the machine to the conditions desired in such commercial output. However, when the operator is required to deal with uppers of varying sizes presented to him more or less at random, he is obliged to make repeated settings of the timer.

The machine of the present invention on the contrary is so organized that the point of tape cut off will occur at the desired point regardless of the height or size of the upper. For example, if it is desired to leave one-half inch of the back seam uncovered to accommodate top folding, the machine will apply and sever tape in that manner regardless of its required length. The operator is thus relieved of repeated settings of a timer and can proceed to reinforce uppers of different sizes presented at random, but always leaving an uncovered zone of three-eights inch within the edge of the upper to accommodate top folding.

To that end the machine of this invention on comprises work-feeding rolls, a segmental work guide and a tape chute both directed to the bite of the feed rolls, a segmental presser foot cooperating with the work guide in combination with a microswitch mounted for bodily adjustment on the presser foot and power operated means for severing the tape timed in its operation by the present adjusted position of the microswitch.

It will be apparent that in such a machine the current or present setting of the microswitch determines in each case the distance of the tape cut off point from the trailing edge of the upper whatever may be the shape of the upper.

A described characteristic of the present invention is that by locating the controlling microswitch in the presser foot an advantageous compact and quick acting mechanism is made available. It also facilitates mounting the presser foot and microswitch for bodily yielding adjustment to accommodate work of varying thickness.

These and other features of the invention will be best understood and appreciated from the following description of a preferred embodiment thereof, selected for purposes of illustration and shown in the accompanying drawings, in which—

FIGS. 2, 3 and 4 are fragmentary views showing the operating instrumentalities of the machine with the work in progressive positions, and FIG. 5 is a fragmentary view of the work as it comes from the machine.

Figure 1:
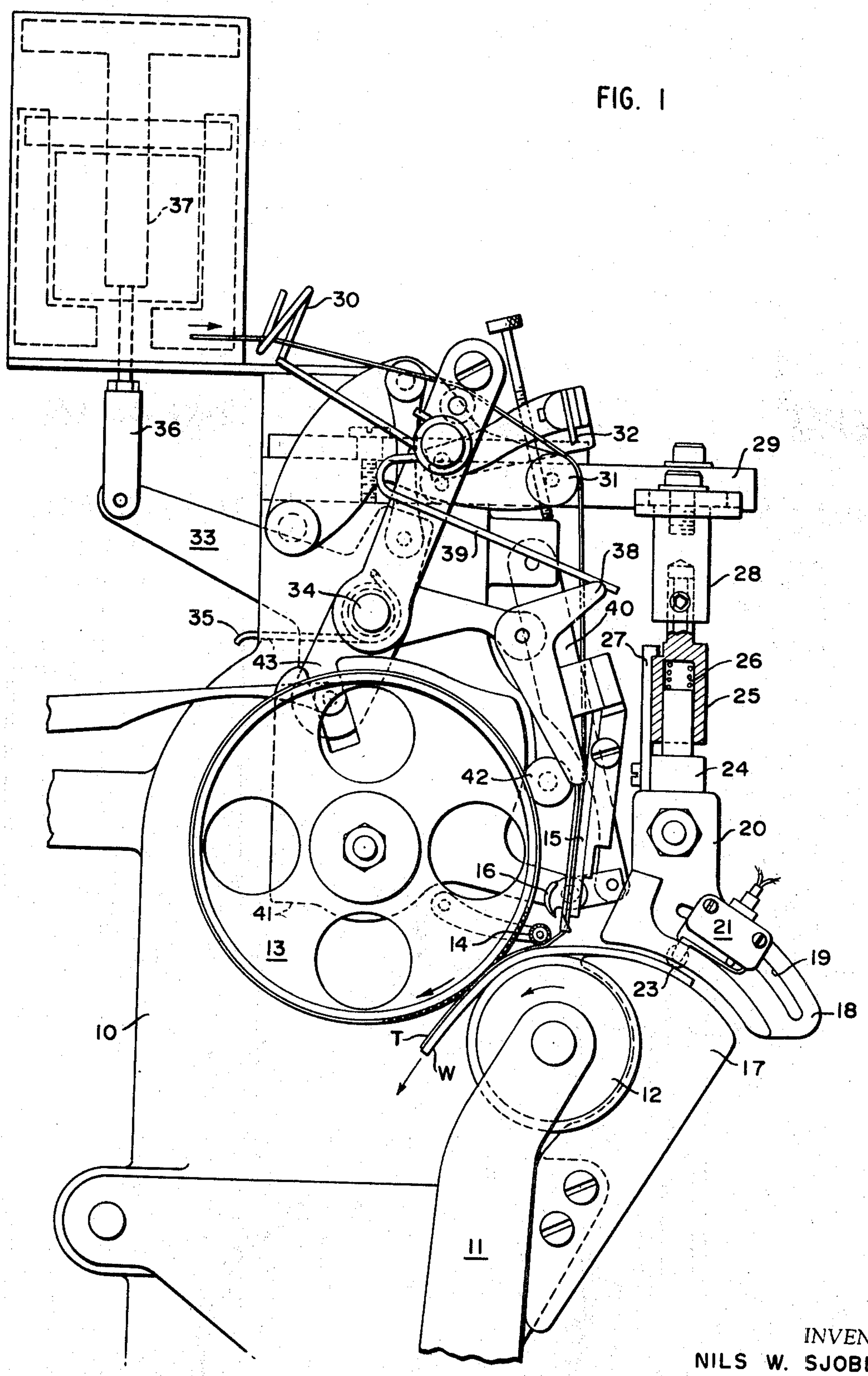
FIG. 1 is a view of the machine in side elevation.

One example of the work done by the illustrated machine is suggested in FIG. 5 where portions W of the upper of a shoe are closed by a back seam to which a length of tape T has been applied in the manner for which the present machine is adapted. The back seam extends from the leading edge of the upper for the full height thereof. The tape extends from the leading edge of the upper but is cut off short of the trailing edge. The uncovered portion may be skived for finishing by folding, but the tape T terminates sufficiently short of the trailing edge so that it will not be caught in the folded portion of the upper.

The machine comprises a frame 10 of which only portions thereof are shown in the drawings. A bracket 11 is attached to the front side of the frame and in this bracket is journaled an idle roll 12. Cooperating with idle roll 12 is a large driven feed roll 13 and a small knurled feed roll 14 carried by a long transverse shaft, not shown. Both the large feed roll 13 and the small feed roll 14 are driven continuously by means not herein shown but which may correspond to those described in the tape applying machine of U.S. Pat. 3,012,261, Small, to which reference may be had for further details of the driving mechanism.

The tape is delivered to the small feed roll 14 by a vertical chute 15 bodily movable from its inoperative position as shown in FIG. 4 to a lower tape delivering position as shown in FIG. 3.

A stationary segmental guide 17 having a convex work-engaging edge is mounted in the frame adjacent to the idle roll 12. The upper W is guided by and rides upon the guide 17 as it is advanced in a curved path to the bite of the rolls 12 and 13.

A segmental presser foot 18 is mounted above and in cooperative relation with the guide 17 and is provided with a segmental slot 19 in which is adjustably mounted a microswitch 21 provided with a clamping screw 22 by which the microswitch may be adjustably secured in any position throughout a range of movement defined by the slot 19 and arranged to be triggered by a roll 23 or shoe. The microswitch is complete and self-contained in that it carries its own operating trigger. The presser foot 18 and its slot 19 are concentric with the curved edge of the guide 17 so that adjustment of the microswitch may be effected without disturbing the relationship of the work and the presser foot.

The presser foot has a shank 20 in the upper end to which is secured a shouldered rod 24. This in turn is received in a sleeve member 25 where it is yieldingly depressed by a spring 26 and has a slip connection with the shank of the presser foot controlled by a latch 27. The sleeve member 25 has a reduced shank which is adjustably received in a cylindrical head 28 adjustably connected to a horizontal overhead arm 29 which is bolted to the upper part of the machine frame. It will be seen therefore that the presser foot 18 is mounted in vertically yielding relation to the segmental guide 17 beside being bodily and vertically adjustable and horizontally adjustable by reason of its connection with the arm 29.

The tape is applied from a reel not shown and guided to the machine by a wire guide 30, then over a roll 31 mounted on the arm 29 and cooperating with a movable blade 32 to form a tape lock at the time of cut off. From the roll 31 the tape passes downwardly through the tape chute 15 and to the point of application.

A spider 33 is rotatably mounted upon a transverse shaft 34 in the machine frame and biased always in a clockwise direction by a torsion spring 35. The spider is connected through a link 36 to the armature of a solenoid 37. One arm of the spider 33 carries a rocker 38 upon which is mounted the tape chute 15 and the rocker is engaged by a spring 39 which tends always to depress the chute 15.

A cam 41 of irregular contour is rotatably mounted concentrically with the feed roll 13 and arranged to be rocked by connection with a lower arm 43 of the spider. The cam 41 also controls a link 40 through which the knife 16 is operated. The link 40 is pivoted at its upper end to a lug projecting from the machine frame and carries a cam roll 42 in contact with the cam 41.

When the machine is at rest the solenoid is energized and the various instrumentalities of the machine occupy the positions shown in FIG. 2. When the advancing edge of the work W engages the trigger roll 23 the current is cut off and the spring 35 becomes effective to rock the spider in a counterclockwise direction. The cam 41 is therefore rocked in the opposite direction and the circuit held open so long as the trigger roll 23 rides on the work W as shown in FIG. 3.

When the roll 23 drops off the work W, as it is about to do in FIG. 4, the solenoid is energized and the cam 41 rocked reversely to its initial position, causing the tape chute 15 to retract and the knife 16 to sever the tape as suggested in FIG. 4.

The adjusted setting of the microswitch in the presser foot determines the location of the cut off point with respect to the trailing edge of the work. In FIG. 4 the microswitch is set to bring the cut off point flush with the edge of the work. If the microswitch were to be adjusted nearer to the knife 16 and feed roll 14 the cut off point would fall substantially within the trailing edge of the work. The uncovered portion of the back seam would therefore be of the same length regardless of the length of the applied tape.

In the catalog of the machine parts the guide element 17 is designated as a "guide comb" in that it operates to comb or smooth the two side margins of the upper at the back seam. Similarly the presser foot 18 is listed as a "seam guide" since the upper is presented with the back seam in guided contact therewith.

Having thus disclosed my invention and described in detail an illustrative embodiment thereof, I claim as new and desire to secure by Letters Patent:

1. A tape laying machine comprising work feeding rolls, a segmental work guide and a tape chute both directed to the bite of the feed rolls, a segmental presser foot cooperating with the work guide, a self-contained microswitch mounted for bodily adjustment on said presser foot, and power operated means for severing the tape timed in its operation by the instant adjusted position of the microswitch in the presser foot.

2. A tape laying machine as described in claim 1, further characterized in that the presser foot has a curved slot in which the microswitch is fitted for bodily adjustment in a curved path parallel to the edge of the segmental work guide.

3. A tape laying machine as described in claim 1, further characterized in that the presser foot has a curved face for engaging the work against the segmental edge of the work guide and that the microswitch has a trigger roll arranged to move with the microswitch in a path determined by the segmental work guide.

4. A tape laying machine as described in claim 1, further characterized in that the presser foot is mounted for yielding bodily movement together with the complete microswitch to accommodate work of varying thickness.

5. A tape laying machine as described in claim 1, further characterized in that the microswitch has a closely related trigger roll and that the microswitch and trigger roll are adjustable in their established relationship along a curved slot in the segmental presser foot.

6. A tape laying machine as described in claim 1, further characterized in that the work guide is shaped as a convex track to engage the back seam of an upper while the presser foot is shaped to smooth the two side margins of the upper on both sides of the back seam.

7. A tape laying machine as described in claim 1, further characterized in that the work guide has an outwardly convex curvature and that the presser foot has a correspondingly concave work-engaging surface and a concentric slot in which the microswitch is mounted.

References Cited

UNITED STATES PATENTS

| | | | |
|---|---|---|---|
| 2,223,209 | 11/1940 | Groh et al. | 12—59.5 |
| 2,871,493 | 2/1959 | Vachon | 12—59.5 |
| 3,102,287 | 9/1963 | Sjoberg | 12—59.5 |
| 3,341,872 | 9/1967 | Heiseler | 12—59.5 |

PATRICK D. LAWSON, Primary Examiner